June 3, 1952  P. P. REICHERTZ  2,599,413
DRILLING MUD RESISTIVITY METER
Filed Jan. 18, 1950  3 Sheets-Sheet 1

*Paul P. Reichertz*
INVENTOR.

BY
AGENT

Paul P. Reichertz
INVENTOR.

BY D. Carl Richards
AGENT

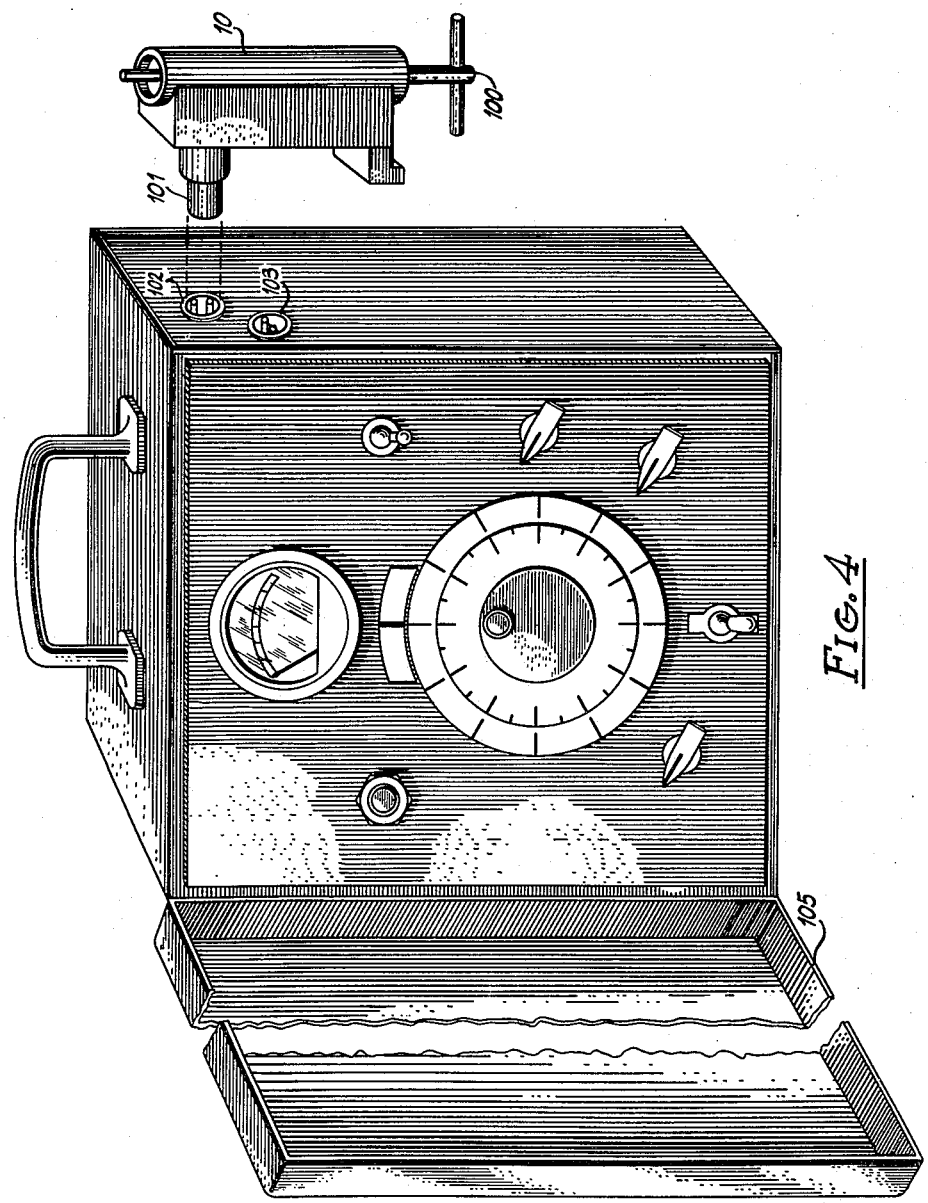

Patented June 3, 1952

2,599,413

UNITED STATES PATENT OFFICE 2,599,413

DRILLING MUD RESISTIVITY METER

Paul P. Reichertz, Dallas, Tex., assignor, by mesne assignments, to Socony-Vacuum Oil Company, Incorporated, New York, N. Y., a corporation of New York Application January 18, 1950, Serial No. 139,268

7 Claims. (Cl. 175—183)

This invention relates generally to the measurement of characteristics of fluids and more particularly to a meter for measuring directly the specific electrical resistivity of a fluid such as liquids collected from wells or muds used in connection with drilling.

There has been found to be a considerable need for information on the electrical properties of drilling muds, drilling fluid filtrates, formation waters, and core samples in interpreting data obtained from electrical well logging techniques.

Electrical resistivity and self-potential logs are used to examine rocks and formations penetrated by a bore hole and are important as an aid in the location of sections in a particular bore or well where the production of oil might be expected and, just as important in well completion practices, the location of sections where the production does not appear possible. In obtaining resistivity curves, an electrode or electrodes are lowered into a bore hole, current is passed therefrom to the formations, and a potential drop due to flow of that current is measured. The mud or liquid in the hole unavoidably forms a part of the current path and thus has a direct effect upon the apparent or measured resistivity. Without suitable correction for the characteristics of the mud, the apparent resistivity may, and often does, differ considerably from the true resistivity of the formations. By making such a correction in apparent resistivity a major variable independent of formation is removed.

In self-potential measurements, it has been found empirically that in the Gulf Coast area, sand formations generally are characterized by a negative self-potential as compared to adjacent shales. However, where the formation water in the sand is less saline and consequently of lower resistance than the mud in the bore, the self-potential difference may be positive.

Thus, there is apparent the need for mud and formation fluid resistivity data for interpretation of resistivity and self-potential logs.

In accordance with the present invention, there is provided an apparatus for measuring the resistivity of liquids and comprises a circuit including a liquid sample cell, a fixed resistance, a pair of electrodes immersed in the cell and means for controlling the current flow through the circuit. A null detecting circuit is provided for comparing the potential drop across the fixed resistance produced by the flow of a known current therethrough and the potential drop between the electrodes in the cell and includes a source of potential in phase opposition to the potential drop across the fixed resistance and between the electrodes and a potentiometer for varying the magnitude of the potential from the potential source to balance the null measuring circuit.

In a preferred form of the invention, a potentiometer accurately calibrated in terms of specific resistivity of the fluid in the cell is utilized to vary the potential from the potential source.

For further objects and advantages of the invention and for a more complete description thereof, reference may now be had to the following description taken in conjunction with the accompanying drawings in which:

Fig. 4 is a view of a portable meter incorporating the present invention.

Figure 1:
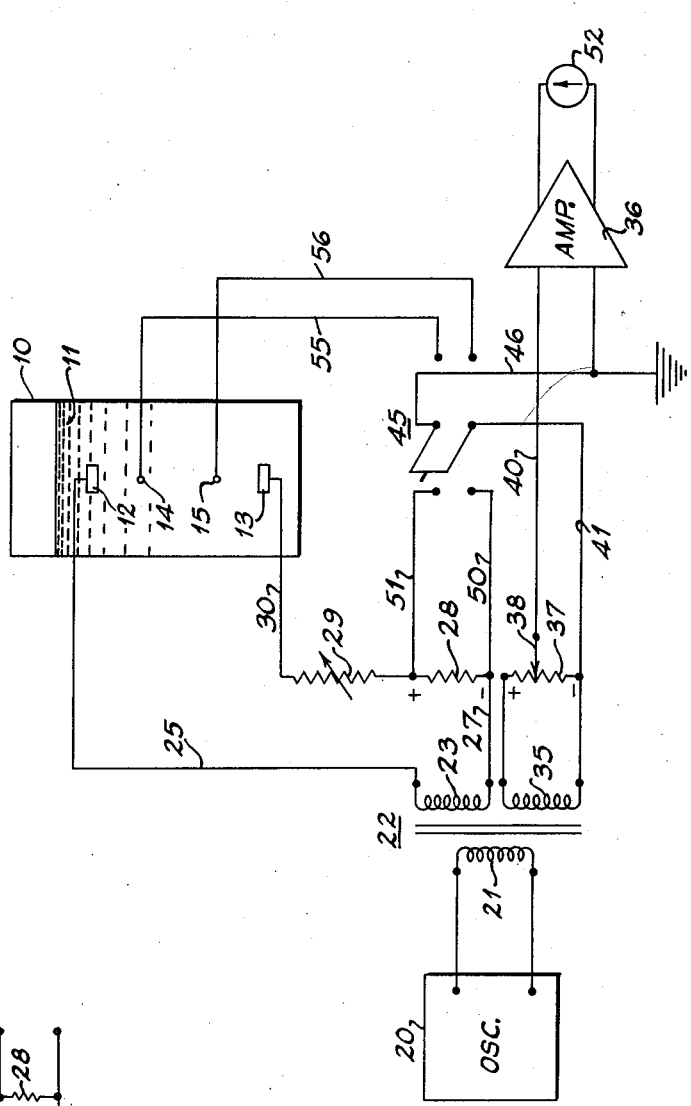
Fig. 1 is a schematic diagram of the invention.

Referring now to Fig. 1, there has been illustrated a cell 10 containing a sample of liquid 11, the resistivity of which it is desired to measure. The sample cell is provided with current electrodes 12 and 13 and potential electrodes 14 and 15. The resistivity of the liquid in the cell 10 is determined by a potentiometric measurement in which a known current is caused to flow through the liquid between the current electrodes 12 and 13 and the potential drop across that portion of the liquid between the electrodes 14 and 15 is, in effect, measured.

As illustrated, there is provided an oscillator 20 whose output terminals are connected to the primary winding 21 of a transformer 22. Transformer 22 is provided with two secondary windings, one of which, the secondary winding 23, is connected to the cell 10. More particularly, conductor 25 is connected from the upper terminal of the winding 23 to the current electrode 12. The lower terminal of winding 23 is connected by way of conductor 27, fixed resistance 28, variable resistance 29 and conductor 30 to the current electrode 13. When the oscillator 20 or an equivalent source of alternating current is energized, current flows through the sample between electrodes 12 and 13. The magnitude of the current is determined by the voltage induced in winding 23, the resistances 28 and 29 and the resistance offered by the liquid in the cell 10.

The output from the oscillator 20 is also coupled by way of the secondary winding 35 to a null detector or amplifier 36 by means of a potentiometer 37 connected directly across the terminals of transformer secondary 35 with its variable tap 38 connected directly by way of conductor 40 to a first input terminal of the null detector 36. Conductor 41 connects the lower terminal of the potentiometer to a double-pole, double-throw switch 45 and thence by way of conductor 46 to the second input terminal of the null detector 36 and to an electrical ground.

The null detector 36 and the potentiometer 37 having a reference voltage from secondary 35 applied to the terminals thereof is utilized to measure or determine, first, the magnitude of the current flowing through the cell 10, and second, the magnitude of the potential drop between the electrodes 14 and 15. The above current and voltage measurement immediately suggest an Ohm's law calculation of a resistivity function of the liquid in the cell 10. As will later be more completely explained, the calculation itself is accomplished by proper construction and operation of the above-described basic circuit.

The measurement of the current is accomplished by connecting the resistor 28 into the input circuit of the null detector 36 with the potential drop thereacross in phase opposition to the potential across the variable portion of the potentiometer 37, i. e., between the tap 38 and conductor 41. More particularly, conductors 50 and 51 connected to the terminals of resistor 28 are connected to one pair of terminals of the double-pole, double-throw switch 45. When the switch is in the left-hand position, the input circuit of the null detector 36 includes, in series, the resistance 28 and the selected portion of the potentiometer 37. Thereupon, the position of the tap 38 may be varied until a potential point is reached that is equal and opposite the potential drop across the resistor 28 thereby to produce a voltage null in the input circuit of the amplifier 36 which will be indicated on meter 52. Alternatively, the tap 38 on potentiometer 37 may remain fixed and resistor 29 varied changing the cell current to produce a similar null indication.

After a first voltage null has been obtained, switch 45 may be shifted to the right-hand position in which the electrodes 14 and 15 and the liquid therebetween is in the input circuit of the amplifier 36 and in series with the portion of the potentiometer 37. More particularly, conductors 55 and 56 connect electrodes 14 and 15 to the right-hand terminals of the double-pole, double-throw switch 45. In effect, the resistance of the liquid between electrodes 14 and 15 is substituted for the resistance 28 as respects the input circuit of amplifier 36. Thereupon, the tap 38 of potentiometer 37 may be varied until a second null is obtained. The ratio of the values of the voltages tapped off from the potentiometer 37 for the production of the two voltage nulls in the input circuit of the detector 36 is directly proportional to the resistivity of the fluid contained in the cell. Thus, regardless of the magnitude of the current in the cell upon production of a first voltage null, the ratio obtained by making two null measurements and noting the voltages required to produce the nulls (or, the ratio of the resistance between the tap 38 and conductor 41), a resistivity function for the liquid in the cell may be obtained.

Figure 2:
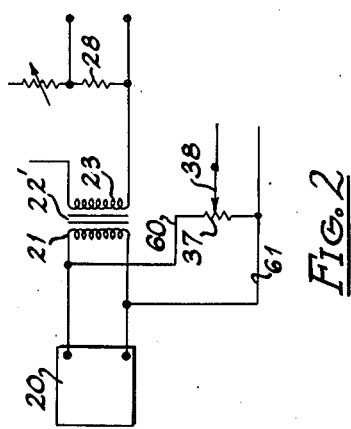
Fig. 2 is a modification of Fig. 1.

Fig. 2 illustrates a modification of the portion of the circuit of Fig. 1 by which the voltage from the oscillator 20 is derived for use in the cell circuit and in the null indicating circuit. As illustrated in Fig. 2, the twin secondary transformer 22 of Fig. 1 has been replaced by a single secondary transformer 22'. In this modification, the potentiometer 37 is connected across the primary of transformer 22' as by conductors 60 and 61. In general, the present invention requires only that the voltages used in the cell circuit and in the null detecting circuit be of the same frequency and synchronized; that they are not conductively associated except through the one common link necessary for measurement (i. e., through resistor 28 or electrodes 14 and 15) and that they be mixed in the input circuit of the amplifier 36 in phase opposition. If the foregoing requirements are satisfied, any desired source and circuit arrangement for production of same may then be used.

Figure 3:
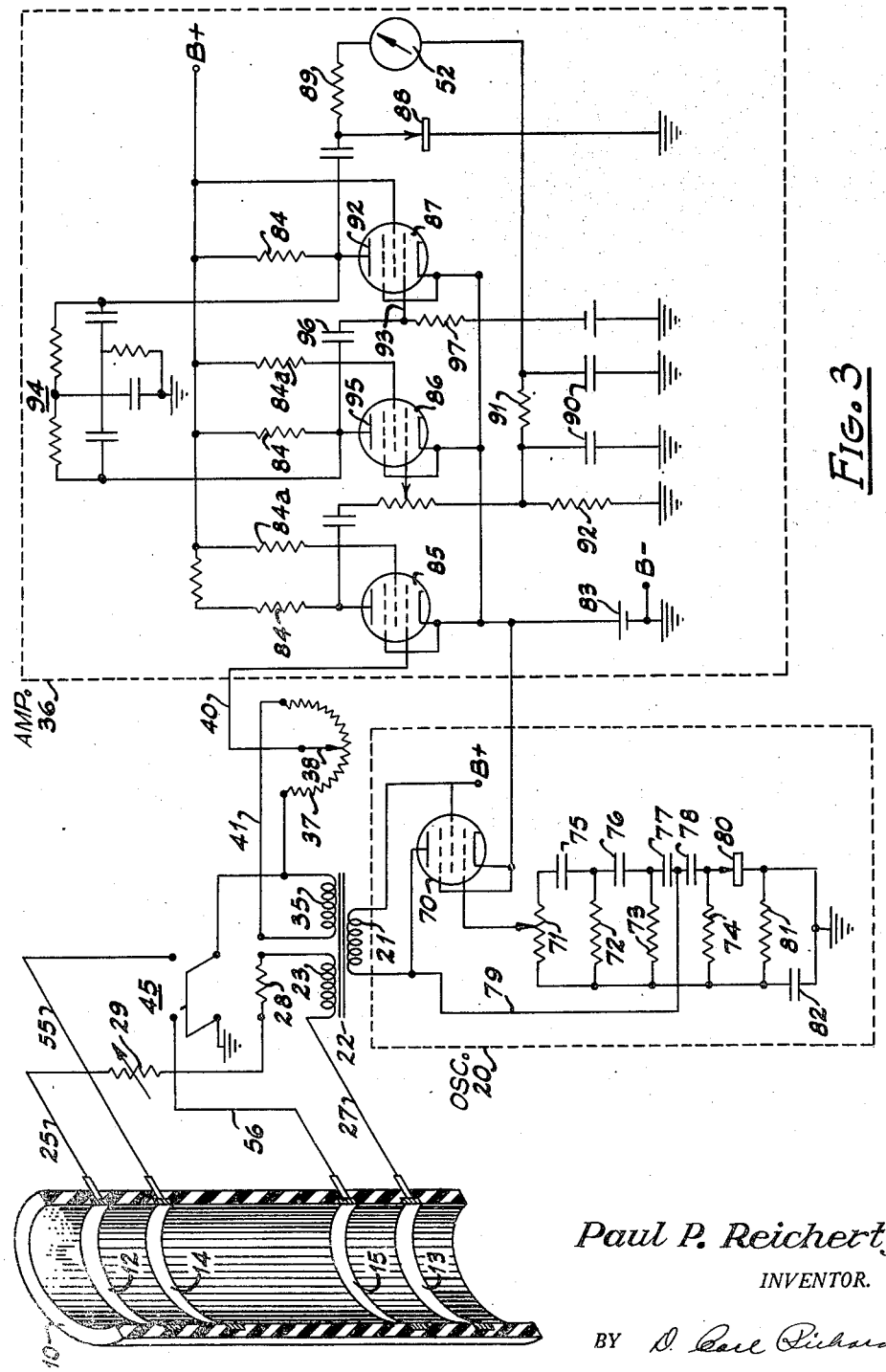
Fig. 3 is a detailed schematic diagram of the meter circuits.

Referring now to Fig. 3, there is illustrated in greater detail the elements and circuits diagrammatically illustrated in Fig. 1. The cell 10 may comprise an elongated tube of insulating or non-conducting material (illustrated in section) having embedded in the walls thereof the electrodes 12—15 in the form of metallic rings suitably spaced one from the other. The tube 10 may then be provided with a stopper or plug for the bottom to retain liquids therein during measurement. The inner surface of the electrode rings conform with the inner surface of the cell cylinder to permit it readily to be cleaned, thus facilitating the operation of the instrument.

The oscillator 20 is illustrated as being of the resistance-capacitance (RC) type and includes a pentode 70 having in the grid circuit thereof a resistance-capacitance network including resistances 71—74 and condensers 75—78. Energy from the anode of tube 70 is fed into the grid RC network by way of conductor 79 to provide the necessary feedback to sustain oscillation. Oscillators of this general type and equivalents thereof are well known in the art and may be readily constructed by reference to suitable handbooks. The frequency of operation is preferably in the low audio range, for example 100 C. P. S., though not limited thereto. In the particular oscillator illustrated in Fig. 3, a rectifier 80 and the resistance 81 and condenser 82 stabilize the output of the oscillator, acting to regulate or control the effective grid bias provided by the bias battery 83 connected in the cathode circuit of the tube 70. The potential rectified through the diode 80 in the grid circuit of the oscillator tube 70 is, of course, proportional to the magnitude of the output energy fed into the grid circuit by way of conductor 79 and is of polarity such as to increase the negative bias, i. e., additive with respect to the battery 83, thereby to decrease the gain of the tube 70 when the output thereof tends to increase and thus provides a measure of amplitude stabilization for the oscillator output.

The voltage appearing at the tap 38 of the potentiometer 37 is coupled by way of conductor 40 to the input grid of tube 85 of the amplifier 36. In the modification illustrated in Fig. 3, the amplifier 36 includes tubes 85, 86, and 87, whose cathodes are directly coupled in a common circuit and connected to the positive terminal of battery 83 to be normally biased for amplification of input signals. Tubes 85, 86 and 87 are of the pentode type, each having its suppressor grid coupled to its cathode and its anode connected by way of load resistor 84 to a source of B-supply (B+). The screen grids of tubes 85 and 86 are connected to B+ by way of screen resistors 84a. The screen grid of tube 87 is connected directly to B+. The output of the final tube 87 is fed to a rectifier 88 effectively connected between the anode 92 of tube 87 and ground. In parallel with the diode 88, there is provided a feedback-indicating circuit comprised of resistor 89, meter 52 and a smoothing circuit or filter including condensers 90 and resistor 91. The output terminal of resistor 91 is connected to ground through resistor 92 which forms a part of the grid impedance for tube 86. For a given level of signal applied to the input of tube 85, the output of tube 87 is rectified and a constant deflection appears on meter 52 due to the smoothing action of the filter comprising the condensers 90 and resistor 91. The tube 86 preferably is of the remote cut-off type so that flow of the rectified or direct current through the feedback resistor 92 produces a biasing voltage thereacross additive in polarity, in the grid cathode circuit of tube 86, with the bias battery 83 to shift the operating point on the $Eg$—$Ip$ characteristic of tube 86 to a point approaching cut-off.

Thus, for high values of input signal, a large voltage is developed across resistor 92 and the meter 52 is thus protected from excessive deflections. As a practical matter, the amplification of the amplifier 36 as a function of input voltage is logarithmic, being very small for a large input signal and a maximum when a voltage null is produced in the input circuit. This means that potentiometer 37 or resistor 29 may be adjusted for a voltage null very accurately, the effect of such variation at the critical null point being indicated with great sensitivity. Thus, the accuracy of the instrument is dependent only upon the accuracy of calibration of potentiometer 37.

In addition to the D. C. feedback above described, a second or alternating current feedback circuit is utilized between the anode 92 of tube 87 and its grid 93. Energy from the anode 92 is fed through a parallel-T filter network 94 which is coupled to the anode 95 of tube 86 and thence by way of coupling condenser 96 and grid resistor 97 in the input of tube 87. The parallel-T filter network is designed to attenuate in the feedback loop signals of the same frequency as those from the source oscillator 20 and to sustain in the feedback loop all other frequencies. Thus, the amplifier has a low effective amplification, due to the negative feedback, of all frequencies except the desired signal.

The foregoing utilization of two separate feedback networks has the effect of making the amplifier insensitive to any signal except from the source 20 and permits the amplifier to be particularly sensitive to that signal only when a voltage null is produced in the amplifier input circuit thereof.

The circuits illustrated herein and above described have been found to be particularly desirable in measurement of the resistivity of a liquid wherein a first voltage null is produced in the input on the amplifier 36 with the potentiometer then set at a value which represents the current flowing through the cell 10 and for the detection of a second voltage null, when the portion of the fluid in the cell between the electrodes 14 and 15 replaces the resistor 28, by variation of the potentiometer 37 whereby the ratio of the readings of the potentiometer 37 is directly proportional to the resistivity of the liquid in the sample cell 10. It is to be understood, however, that the descriptive specification of particular components should not be taken by way of limitation but rather are illustrative of a particular embodiment that has been found to be desirable.

In Fig. 4 there has been illustrated one embodiment of the present invention as housed in a portable case for use in field operations. It will be recognized that stable and dependable sources of power are not always available at a drill site where studies of bore hole fluids generally and of drilling muds particularly are to be made. The use of low-drain tubes in the circuits will permit the inclusion of necessary A and B batteries in the meter case along with the circuits per se. In one embodiment of the invention, the tubes 70 and 87 were of the type 3V4, and the tubes 85 and 86 were 1U4's. For regular testing operations, 90 volt B-batteries and 1½ volt A-batteries would supply the load presented by the meter circuits for as long as 6 months. Accordingly, the unit illustrated in Fig. 4 has been found to satisfy existing field needs.

It is to be noted that the cell 10, Fig. 4, is fitted at the lower end with a stopper or plug (not shown) carried by the handle 100 to close the lower end of the cell and maintain liquids therein for the period during which the measurement is conducted, also, the four electrodes embedded in the walls of the cell 10 are electrically terminated in four contacts of a multi-terminal plug 101. A complementary plug 102 is carried on the surface or in the side of the meter so that the cell 10 may readily and conveniently be plugged thereinto. As illustrated, the receiving plug 102 is so oriented that when the meter is placed in the upright position the cell 10 may be "plugged in" upright. It has been found advantageous and convenient to include a second multiterminal receiving plug electrically parallel to the plug 102 and oriented so that the meter may be placed face up with the cell vertical. The lid or cover 105 for the meter is provided with suitable compartments (not shown) for storage of the cell 10 when not in use.

There will now be described the manner of operating the instrument with particular reference to Fig. 3. In such a measuring instrument, it is desirable that the reading of the variable parameter or variable component of the circuit be calibrated directly in terms of specific resistivity of the liquid under measurement or, that the Ohm's law calculation, hereinbefore mentioned, be performed by the instrument. In the present case, this may readily be accomplished particularly if the potentiometer 37 is a precision-built, wide-range unit linear throughout its range or if not linear then, accurately calibrated. One unit of this type is commercially available under the trade name of "Helipot" manufactured and sold by The Helipot Corp., South Pasadena, California.

The instrument is calibrated by the following steps. A solution of known specific resistivity such as sodium chloride, potassium chloride, sulphuric acid, etc., is placed in the cell 10. The specific resistivity of such solutions for a given temperature may be determined by reference to handbooks. With the solution of known resistivity in the cell, the switch 45 as viewed in Fig. 3 is placed in the upper position so that the electrodes 14 and 15 are in the input circuit of the amplifier 36. The oscillator 20 is then energized to cause alternating current to flow through resistance 28 and 29 and the cell 10. If the potentiometer or "Helipot" 37 is graduated in numbers, for example, from 1 to 1,000, the tap 38 is adjusted so that the potentiometer reading corresponds numerically with the specific resistivity of the standard fluid placed in the cell. Thereafter, the resistor 29 is varied until a null reading is indicated on meter 52. Switch 45 is then moved to the lower position, placing the resistance 28 in the input circuit of amplifier 36. The tap 38 on potentiometer 37 is then varied until a second null is noted on meter 52. The numerical value of the potentiometer reading corresponding to the associated second null indication is then noted. This second null reading will then be the meter base or the starting point for all subsequent tests using the particular cell in the measurement of liquids of unknown resistivity to be placed in the cell 10.

For example, once the above calibration has been performed and a meter base obtained, the measurement of the specific resistivity of an "unknown" liquid is accomplished as follows. The potentiometer 38 is set at the meter base as above determined upon calibration. The unknown liquid is placed in the cell 10, switch 45 is moved to the lower position placing resistance 28 in the input circuit of amplifier 36 and resistance 29 is then varied until a null is observed on meter 52. The cell current flowing at such a null position is the same magnitude as the current flowing through the standard solution in the calibration of the instrument. Thereafter, the switch 45 is moved to the upper position and the potentiometer varied until a second null is noted. The null reading of the potentiometer setting corresponds numerically with the specific resistivity of the unknown mud sample placed in the cell.

Though the invention has been illustrated by the above modifications thereof, it is to be understood that further modifications within the scope of the appended claims may now suggest themselves to those skilled in the art.

What is claimed is:

1. A system for measuring the resistivity of a liquid comprising a circuit including a cell containing said liquid, a fixed resistance, a source of alternating current and a variable resistance for controlling the magnitude of the current in said circuit, means for determining the adjustment of said variable resistance at which a predetermined current flows through said cell comprising a null detector having in its input circuit said fixed resistance and a potentiometer in circuit with said source, only a predetermined portion thereof being effective in said input circuit so that a voltage of predetermined magnitude is in phase opposition to the potential across said fixed resistance whereupon flow of said current of predetermined magnitude will produce a voltage null in said input circuit, means for replacing said fixed resistance in said input circuit by a portion of the liquid current path in said cell whereby variation of said potentiometer changing said predetermined portion produces a second voltage null in said input circuit, the ratio of said predetermined portions of said potentiometer corresponding with said voltage nulls being proportional to the resistivity of the liquid in said cell.

2. A system for measuring the resistivity of a liquid comprising a circuit including a cell containing said liquid, a fixed resistance, a source of alternating current and a variable resistance for controlling the magnitude of the current in said circuit and through said cell, means for determining the adjustment of said variable resistance at which a predetermined current flows through said cell comprising a null detector having in its input circuit said fixed resistance and a source of potential of predetermined magnitude and in phase opposition to the potential across said fixed resistance whereupon flow of said current of predetermined magnitude will produce a null in said input circuit, means for replacing said fixed resistance in said input circuit by a portion of the current path in said cell and means for varying said potential from said predetermined value to produce a second voltage null in said input circuit whereby the ratio of said potentials corresponding with said voltage nulls is proportional to the resistivity of the liquid in said cell.

3. A system for measuring the resistivity of a liquid adjacent four spaced apart electrodes which comprises a current circuit including a source of alternating current, a resistance and two of said electrodes connected in series for flow of current through the liquid between said electrodes, a null detecting circuit including in the input circuit thereof said resistance and a source of potential in phase opposition to the voltage across said resistance, means for varying the magnitude of said potential to produce a null in said input circuit as a measure of said current, means for replacing said resistance in said input circuit with the second pair of electrodes and the fluid therebetween to produce a second null upon variation of said potential as a measure of the voltage drop across said liquid, whereby the ratio of said potentials at said two nulls is proportional to the resistivity of said liquid.

4. A liquid resistivity meter comprising a four electrode sample cell, a resistance and a source of alternating current connected in series with the extreme electrodes of said cell for flow of current through the fluid therein, a potentiometer and a null detector connected in series circuit with said resistance, a source of reference voltages connected across said potentiometer in out-of-phase relation to the voltage across said resistance due to flow of said current for producing a first voltage null in said series circuit by variation of said potentiometer, and switching means for connecting said potentiometer and said null detector in circuit with the intermediate electrodes of said cell and the fluid therebetween for producing a second voltage null upon further variation of said potentiometer whereby the ratio of the value of said potentiometer settings at said null is proportional to the resistivity of said fluid.

5. In a system in which an alternating current from a single frequency source traverses a circuit including in series a resistance and liquid between a pair of current electrodes, means for measuring the resistivity of said liquid which comprises an amplifier having a potentiometer in its input circuit and an output circuit, a source of alternating current potential of said frequency connected across said potentiometer, a second pair of electrodes positioned in the path of current flow in said liquid, switching means for selectively including in said input circuit said resistor or said liquid between said second pair of electrodes for nulling the voltage drops thereacross by variation of said potentiometer to reduce to zero the signal input to said amplifier, a negative feedback circuit connected to said output circuit responsive to the amplifier signal output for reducing the gain of said amplifier when said input signal is not zero, and filter means for selectively attenuating all frequencies in said amplifier except that of said single frequency source whereby said system has high sensitivity exclusively to the frequency of said source at said null points only and means connected to said output circuit for indicating the null adjustment of said potentiometer.

6. A system for measuring the resistivity of a liquid which comprises four electrodes immersed in said liquid, a voltage source connected to a first pair of said electrodes for driving an alternating current of controlled frequency through said liquid, a resistance in circuit with said first pair of electrodes, means for determining the magnitude of said current and the potential drop between the second pair of said electrodes including an amplifier having an output circuit and an input circuit which includes means for deriving an alternating current voltage from said source, a potentiometer, and means for selectively including either said resistance or said second pair of electrodes with the potential thereacross in phase opposition to the potential across said potentiometer whereby variation of said potentiometer produces a voltage null in said input circuit, a direct current feedback circuit for increasing the overall gain of said amplifier as said null point is approached by variation of said potentiometer, and an alternating current negative feedback current having means for sustaining in said feedback circuit all frequencies except those from said source to permit high sensitivity at said null only to the frequency of said source, and an indicator connected in the output circuit for detecting said null.

7. A system for measuring the resistivity of a liquid which comprises a multi-electrode cell containing said liquid immersing the electrodes of said cell, a voltage source of predetermined frequency for driving an alternating current through the liquid between a selected pair of said electrodes, null means for measuring the potential drop across a portion of said liquid between a pair of said electrodes different than said selected pair in the current flow path and including said voltage source connected in phase opposition to said potential drop, an amplifier, means for applying to the input of said amplifier the unbalance output voltage from said null circuit, rectifying means in the output of said amplifier, indicating means and a direct current feedback path in circuit with said rectifier for controlling the gain of said amplifier as an inverse function of said unbalance signals, an alternating current feedback path having means therein for eliminating signals of the frequency of said source and for sustaining all other signals effectively to reduce the amplification of said amplifier to all signals except from said source whereby the sensitivity of said system is high at said null points exclusively with respect to signals of said frequency.

PAUL P. REICHERTZ.

REFERENCES CITED

The following references are of record in the file of this patent:

UNITED STATES PATENTS

| Number | Name | Date |
| --- | --- | --- |
| 2,004,569 | Davis | June 11, 1935 |
| 2,280,075 | Hayward | Apr. 21, 1942 |
| 2,416,949 | Perley et al. | Mar. 4, 1947 |